US008786240B2

(12) United States Patent
Shirai et al.

(10) Patent No.: US 8,786,240 B2
(45) Date of Patent: Jul. 22, 2014

(54) METHOD FOR CONTROLLING AN ELECTRIC CYLINDER AND A CONTROL SYSTEM FOR THE ELECTRIC CYLINDER

(75) Inventors: Yoichiro Shirai, Shinshiro (JP); Masahiko Nagasaka, Shinshiro (JP)

(73) Assignee: Sintokogio, Ltd., Nagoya-shi (JP)

( * ) Notice: Subject to any disclaimer, the term of this patent is extended or adjusted under 35 U.S.C. 154(b) by 173 days.

(21) Appl. No.: 13/498,365

(22) PCT Filed: Sep. 1, 2010

(86) PCT No.: PCT/JP2010/064918
§ 371 (c)(1),
(2), (4) Date: Jun. 13, 2012

(87) PCT Pub. No.: WO2011/055585
PCT Pub. Date: May 12, 2011

(65) Prior Publication Data
US 2012/0249042 A1 Oct. 4, 2012

(30) Foreign Application Priority Data

Nov. 3, 2009 (JP) .................................. 2009252518
Nov. 5, 2009 (JP) .................................. 2009253653

(51) Int. Cl.
*G05B 11/01* (2006.01)
(52) U.S. Cl.
USPC ........... 318/560; 318/603; 318/671; 318/672; 318/592
(58) Field of Classification Search
USPC ................................................ 318/687, 560
See application file for complete search history.

(56) References Cited

U.S. PATENT DOCUMENTS

| 5,079,489 A * | 1/1992 | Ishii .............................. 318/560 |
| 5,868,296 A * | 2/1999 | Gentile et al. .................. 226/35 |
| 2011/0132209 A1* | 6/2011 | Senda et al. ..................... 100/35 |

FOREIGN PATENT DOCUMENTS

| JP | 03-045178 | 2/1991 |
| JP | 09-314399 | 12/1997 |

(Continued)

OTHER PUBLICATIONS

International Search Report dated Nov. 29, 2010 issued in International Application No. PCT/JP2010/064918.

*Primary Examiner* — Eduardo Colon Santana
*Assistant Examiner* — Devon Joseph
(74) *Attorney, Agent, or Firm* — Finnegan, Henderson, Farabow, Garrett & Dunner, LLP

(57) ABSTRACT

The invention realizes a method for controlling an electric cylinder and a control system for the cylinder that can prevent a load for pressurizing from significantly exceeding a target load and can shorten the time for the pressurization. A servo controller 17 can set the speed of the rod 11 and a load for stopping Ps that is used for determining whether the rod 11 should be stopped so that the load for pressurizing Pm does not significantly exceed the target load Pt. The servo controller 17 drives the rod 11 under the position control mode and determines whether the load for pressurizing Pm that is detected by a load detector 13 is bigger than or equal to the load for stopping Ps. If it determines that the load for pressurizing Pm is bigger than or equal to the load for stopping Ps, the servo controller 17 provides a reverse command pulse signal to a servo amplifier 16 and causes stored pulses in the servo amplifier 16 to decrease, to thereby stop the rod at the load that does not significantly exceed a target load Pt.

10 Claims, 6 Drawing Sheets

(56) References Cited

FOREIGN PATENT DOCUMENTS

| JP | 11-058099 | 3/1999 |
| JP | 11-192598 | 7/1999 |
| JP | 2005-138110 | 6/2005 |
| JP | 2005-254290 | 9/2005 |
| JP | 2009-101419 | 5/2009 |

* cited by examiner

METHOD FOR CONTROLLING AN ELECTRIC CYLINDER AND A CONTROL SYSTEM FOR THE ELECTRIC CYLINDER

FIELD OF THE INVENTION

The present invention relates to a method for controlling an electric cylinder driven by a servomotor and a control system for the electric cylinder.

BACKGROUND OF THE INVENTION

A device for pressurizing a material to be pressed at a constant target load is well known, wherein the device has a mechanism that uses a servomotor and a load detector. The mechanism feeds the load detected by the detector back to the servomotor, and controls the load at a constant target load (e.g., Patent Documents 1 and 2).

However, the rod of the electric cylinder of the device moves at a velocity of 5 mm/s or more. Therefore, the rod does not stop at the target load for pressurizing because of the inertia of the device, etc., and a significantly bigger load may be applied to the material to be pressed than the target load. Thus, the device has problems in that the material cannot be appropriately pressured, also in that the load detector can be broken by being overloaded, etc.

Therefore, a method is typically used by the speed of the rod of electric cylinder being decreased to about 1 mm/s just before the rod bumps against the material (e.g., Patent Document 3).

However, in this method, the speed of the rod must be greatly decreased, and thus the time needed for pressurization will be extremely long. Especially, if this method is used for a process in which the pressurizing must be repeated in a short cycle, there will be a problem in that its productivity will be inevitably decreased.

Further, a method for pressurizing is proposed to resolve the problem. In that method, after the end of the rod of the electric cylinder bumps against the material and before the load for pressurizing reaches a target load for pressurizing, the speed of the rod will be decreased at a constant rate, or at a proportional rate (e.g., Patent Documents 4 and 5).

Patent Document 1: Japanese Patent Publication Laid-open No. 2005-138110
Patent Document 2: Japanese Patent Publication Laid-open No. 2009-101419
Patent Document 3: Japanese Patent Publication Laid-open No. H11-193598
Patent Document 4: Japanese Patent Publication Laid-open No. H09-314399
Patent Document 5: Japanese Patent Publication Laid-open No. 2005-254290

DISCLOSURE OF THE INVENTION

The inventions of Patent Documents 4 and 5 have a problem: As the target load for the pressurizing increases, the time from decreasing the speed until the device reaches the target load increases. Accordingly, the time for pressurization become longer, and thus if these inventions are used for a process in which the pressurizing must be repeated in a short cycle, their productivity will be decreased.

Also, the invention of Patent Document 4 uses a position-control mode in which the device uses a pulse signal for an output signal from a controller for a servo press to a servo driver. In the position-control mode, an electric cylinder is driven at an appropriate speed and thus it can be stopped at an accurate position. Therefore, this mode is widely used as a control mode. However, in this mode, not only the inertia of the elements in the driving system, but also the number of stored pulses generated in the servo amplifier that drives the servomotor, causes the device to be overloaded.

The number of stored pulses is the differences between the number of feed pulses and the number of feedback pulses in a servo driver. In a drive-system of a servomechanism, the mechanical system, such as a device for pressurizing, has inertia. Accordingly, if the command pulse signal for positioning from a servo controller is provided to a servomotor without any change, the drive-system will be delayed and will not be able to follow the signal. Therefore, the method is used in which the pulses of command for positioning are stored in the deviation counter in the servo driver, and the rotation of the servomotor is controlled in response to the number of stored pulses.

In this system, if it is intended to stop the servomotor, even if the pulse for command for positioning were to be stopped, the servomotor would continue to rotate corresponding to the number of stored pulses until the pulses in the deviation counter reach 0 (zero). Accordingly, the rod will move and the system will be overloaded.

Therefore, unless the problem caused by the stored pulses is resolved, the method for controlling disclosed in Patent Document 4 will not be satisfactorily done when the device for pressurizing is controlled in the position-control mode. Namely, there will appear problems such as the time for pressurization being prolonged, or the load for pressurizing being significantly bigger than a target load, or both.

The invention of this application is a method for controlling an electric cylinder driven by a servomotor and a control system for the cylinder. It aims to prevent a load for pressurizing from significantly exceeding a target load when the servomotor is in a position-control mode or in a speed control mode. Also, it aims to shorten the time for the pressurization.

The invention was made to accomplish these aims. The first aspect of this invention relates to an invention for controlling a position of a servomotor. Namely, it is a method for controlling an electric cylinder in a device, wherein
the device comprises
an electric cylinder that moves a rod,
a load detector attached to the rod that detects the load for pressurizing applied to a material to be pressed,
a servomotor that drives the electric cylinder, and
a position detector attached to the servomotor that is electrically connected to a servo amplifier, wherein
the servo amplifier is electrically connected to the servomotor and a servo controller and controls the drive of the servomotor, and wherein
the servo controller is electrically connected to the load detector and the servo amplifier and outputs a position control command to the servo amplifier so as to control the position of the servomotor,
the method comprising:
a step S1 in which the servo controller sets the speed of the rod, sets a load for stopping that is a load set to less than or equal to a target load, and that is used for determining whether the rod should be stopped so that the load for pressurizing does not exceed the target load, and provides a command pulse signal for positioning from the servo controller to the servo amplifier based on the speed of the rod wherein the speed is input into the servo controller,
a step S2 in which the servo amplifier provides current for driving a motor to the servomotor based on the command pulse signal for positioning, a step S3 in which a servomotor is driven so as to drive the rod by the current for driving a motor, a step S4 in which a signal for a load for pressurizing, wherein the signal corresponds to the load for pressurizing detected by the load detector, is provided from the load detector to the servo controller, a step S5 in which the servo controller determines whether the load for pressurizing is bigger than or equal to the load for stopping based on the signal for the load for pressurizing, a step S6 in which the number of stored pulses is computed if it is determined that the load for pressurizing is bigger than or equal to the load for stopping, wherein the number of stored pulses is the difference between the number of pulses of the command pulse signal for positioning at the determination in step 5 and the number of pulses of the feedback pulse signal that is provided to the servo controller from the servo amplifier based on the signal of an absolute position that is provided to the servo amplifier from the position detector based on the speed of rotation of the servomotor, and a step S7 in which a command pulse signal for positioning in the reverse direction is provided to the servo amplifier from the servo controller, wherein the command pulse signal is a position control pulse signal that decreases the number of stored pulses based on the number of stored pulses computed at step 6.

By the first aspect of this invention, at step S1 a command pulse signal for positioning is provided from the servo controller to the servo amplifier based on the speed of the rod wherein the speed is input into the servo controller, at step S2 the servo amplifier provides current for driving a motor to the servomotor based on the command pulse signal for positioning, at step S3 a servomotor is driven so as to drive the rod by the current for driving a motor, at step S4 a signal for a load for pressurizing, wherein the signal corresponds to the load for pressurizing detected by the load detector, is provided from the load detector to the servo controller, at step S5, the servo controller determines whether the load for pressurizing is bigger than or equal to the load for stopping based on the signal for the load for pressurizing, at step S6 the number of stored pulses is computed if it is determined that the load for pressurizing is bigger than or equal to the load for stopping, wherein the number of stored pulses is the difference between the number of pulses of the command pulse signal for positioning at the determination in step 5, and the number of pulses of the feedback pulse signal that is provided to the servo controller from the servo amplifier based on the signal of an absolute position that is provided to the servo amplifier from the position detector based on the speed of rotation of the servomotor, and at step S7 a command pulse signal for positioning in the reverse direction is provided to the servo amplifier from the servo controller, wherein the command pulse signal is a position control pulse signal that decreases the number of stored pulses based on the number of stored pulses computed at step 6.

Accordingly, the rod is driven in a position-control mode. It is determined whether the load for pressurizing is bigger than or equal to the load for stopping. When it is determined that the load for pressurizing is bigger than the load for stopping, a command pulse signal for positioning in the reverse direction is provided to the servo amplifier. Thus, the rod can be stopped so that the load for pressurizing does not significantly exceed the target load. Also, since the speed of the rod is not reduced until the load for pressurizing reaches the load for stopping, the time for pressurization can be shortened.

The second aspect of this invention relates to the method for controlling an electric cylinder of the first aspect of this invention. Namely, it is characterized in that the number of pulses of the command pulse signal for positioning in the reverse direction is more than or equal to the number of stored pulses.

By the second aspect of this invention, the number of pulses of the command pulse signal for positioning in the reverse direction is more than or equal to the number of stored pulses. Therefore, the number of stored pulses can be rapidly decreased to 0 (zero).

Also, when the number of pulses of the command pulse signal for positioning in the reverse direction is more than the number of stored pulses, the servomotor will reversely rotate and thus the load for pressurizing the material to be pressed can be rapidly decreased. Therefore, the load for pressurizing can be gotten close to the target load in an efficient manner.

The third aspect of this invention relates to a method for controlling an electric cylinder of the first or second aspect of this invention. Namely, it is characterized in that the frequency of the command pulse signal for positioning in the reverse direction is more than or equal to the frequency of the pulse of the command for positioning.

By the third aspect of this invention, the frequency of the command pulse signal for positioning in the reverse direction is more than or equal to the frequency of the pulse of the command for positioning. Therefore, the number of stored pulses can be rapidly decreased, to thereby stop the rod.

The fourth aspect of this invention relates to an invention for controlling the speed of a servomotor. Namely, it is a method for controlling an electric cylinder in a device, wherein the device comprises an electric cylinder that moves a rod, a load detector attached to the rod that detects the load for pressurizing applied to a material to be pressed, a servomotor that drives the electric cylinder, a servo amplifier that is electrically connected to the servomotor and a servo controller and that controls the drive of the servomotor, wherein the servo controller is electrically connected to the load detector and the servo amplifier and outputs a speed control command to the servo amplifier so as to control the speed of the servomotor, the method comprising:

a step S1 in which the servo controller sets the speed of the rod, sets a load for stopping that is a load set to less than or equal to a target load, and that is used for determining whether the rod should be stopped or whether the rod should be driven in the reverse direction to that for pressurizing so that the load for pressurizing does not exceed the target load, and provides a speed command signal from the servo controller to the servo amplifier based on the speed of the rod wherein the speed is input into the servo controller, a step S2 in which the servo amplifier provides current for driving a motor to the servomotor based on the speed command signal, a step S3 in which a servomotor is driven so as to drive the rod by the current for driving a motor, a step S4 in which a signal for a load for pressurizing, wherein the signal corresponds to the load for pressurizing detected by the load detector, is provided from the load detector to the servo controller, a step S5 in which the servo controller determines whether the load for pressurizing is bigger than or equal to the load for stopping based on the signal for the load for pressurizing, a step S6 in which when it is determined that the load for pressurizing is bigger than or equal to the load for stopping, the servo controller stops providing the speed command signal to the servo amplifier, or provides an reverse signal that drives the rod in the reverse direction to that for pressurizing, and a step S7 in which based on the stopping of the speed command signal or based on the reverse signal, the servo amplifier stops providing the current for driving a motor to the servomotor, or provides a current that drives the rod in the reverse direction to that for pressurizing.

By the fourth aspect of this invention, at step S1 a speed command signal is provided from the servo controller to the servo amplifier based on the speed of the rod, wherein the speed is input into the servo controller, at step S2 the servo amplifier provides current for driving a motor to the servomotor based on the speed command signal, at step S3 a servomotor is driven so as to drive the rod by the current for driving a motor, at step S4 a signal for a load for pressurizing, wherein the signal corresponds to the load for pressurizing detected by the load detector, is provided from the load detector to the servo controller, at step S5 the servo controller determines whether the load for pressurizing is bigger than or equal to the load for stopping based on the signal for the load for pressurizing, at step S6, when it is determined that the load for pressurizing is bigger than or equal to the load for stopping, the servo controller stops providing the speed command signal to the servo amplifier, or provides a reverse signal that drives the rod in the reverse direction to that for pressurizing, and at step S7, based on the stopping of the speed command signal or based on the reverse signal, the servo amplifier stops providing the current for driving a motor to the servomotor, or provides a current that drives the rod in the reverse direction to that for pressurizing.

Accordingly, the rod is driven in a speed-control mode based on the speed set for driving the rod. It is determined whether the load for pressurizing detected by the load detector is bigger than or equal to the load for stopping. When it is determined that the load for pressurizing is bigger than the load for stopping, a signal for stopping or driving in the reverse direction is provided to the servo amplifier. Thus, at a target load, the rod can be stopped or can be driven in the reverse direction.

Also, since the speed of the rod is not reduced until the load for pressurizing reaches the load for stopping, the time for pressurization can be shortened.

The fifth aspect of this invention relates to the method for controlling an electric cylinder of the fourth aspect of this invention.

Namely, it is characterized in that the load for stopping is set by the servo controller based on the speed set for driving the rod and the target load.

By the fifth aspect of this invention, the load for stopping is set by the servo controller based on the speed set for driving the rod and the target load. Therefore, the steps for calculating the load for stopping and inputting it to the servo controller can be skipped. Also, errors in calculation or inputting can be eliminated.

The sixth aspect of this invention relates to an invention for controlling a position of a servomotor. Namely, it is a control system for an electric cylinder in a device, wherein the device comprises an electric cylinder that moves a rod, a load detector attached to the rod that detects the load for pressurizing applied to a material to be pressed, a servomotor that drives the electric cylinder, and a position detector attached to the servomotor that is electrically connected to a servo amplifier, wherein the servo amplifier is electrically connected to the servomotor and a servo controller and controls the drive of the servomotor, and wherein the servo controller is electrically connected to the load detector and the servo amplifier and outputs a position control command to the servo amplifier so as to control the position of the servomotor, wherein the servo controller can set the speed of the rod and a load for stopping that is a load set to less than or equal to a target load, and that is used for determining whether the rod should be stopped so that the load for pressurizing does not exceed the target load.

Further, the servo controller drives the rod based on the speed of the rod under the position control mode, and determines whether the load for pressurizing is bigger than or equal to the load for stopping, wherein if it determines that the load for pressurizing is bigger than or equal to the load for stopping then it provides a reverse command pulse signal that drives the rod in the reverse direction to that for pressurizing, and causes the number of stored pulses in the servo amplifier to decrease, to thereby stop the rod.

By the sixth aspect of this invention, the servo controller can set the speed of the rod and a load for stopping that is a load set to less than or equal to a target load, and that is used so that the load for pressurizing does not exceed the target load.

Further, the servo controller drives the rod under the position control mode based on the speed of the rod, wherein the speed has been set, determines whether the load for pressurizing is bigger than or equal to the load for stopping, and if it determines that the load for pressurizing is bigger than or equal to the load for stopping then it provides a command pulse signal for positioning in the reverse direction that drives the rod in the reverse direction to that for pressurizing, and causes the number of stored pulses in the servo amplifier to decrease, to thereby stop the rod.

Thus, the rod can be stopped so that the load for pressurizing does not significantly exceed the target load. Also, since the speed of the rod is not reduced until the load for pressurizing reaches the load for stopping, the time for pressurization can be shortened.

The seventh aspect of this invention relates to a control system for an electric cylinder of the sixth aspect of this invention.

Namely, it is characterized in that the number of pulses of the command pulse signal for positioning in the reverse direction is bigger than the number of stored pulses.

By the seventh aspect of this invention, the number of pulses of the command pulse signal for positioning in the reverse direction is bigger than the number of stored pulses. Therefore, the number of stored pulses can be rapidly decreased to 0 (zero).

Also, if the number of pulses of the command pulse signal for positioning in the reverse direction is more than the number of stored pulses, the servomotor will reversely rotate and thus the load for pressurizing the material to be pressed can be rapidly decreased. Therefore, the load for pressurizing can be efficiently gotten close to the target load.

The eighth aspect of this invention relates to the system for controlling an electric cylinder of the sixth or seventh aspect of this invention. Namely, it is characterized in that the frequency of the command pulse signal for positioning in the reverse direction is more than or equal to the frequency of the pulse of the command for positioning.

By the eighth aspect of this invention, the frequency of the command pulse signal for positioning in the reverse direction is more than or equal to the frequency of the pulse of the command for positioning. Therefore, the number of stored pulses can be rapidly decreased, to thereby stop the rod.

The ninth aspect of this invention relates to an invention for controlling the speed of a servomotor. Namely, it is a system for controlling an electric cylinder in a device, wherein the device comprises an electric cylinder that moves a rod, a load detector attached to the rod that detects the load for pressurizing applied to a material to be pressed, a servomotor that drives the electric cylinder, a servo amplifier that is electrically connected to the servomotor and to a servo controller and controls the drive of the servomotor, wherein the servo controller is electrically connected to the load detector and the servo amplifier and outputs a speed control command to the servo amplifier so as to control the speed of the servomotor, wherein the servo controller can set the speed of the rod and set a load for stopping that is a load set to less than or equal to a target load, and that is used so as to determine whether the rod should be stopped or whether the rod should be driven in the reverse direction to that for pressurizing so that the load for pressurizing does not exceed the target load.

Further, the servo controller drives the rod in a speed-control mode based on the speed set for driving the rod, determines whether the load for pressurizing detected by the load detector is bigger than or equal to the load for stopping, and when it is determined that the load for pressurizing is bigger than or equal to the load for stopping the servo controller stops providing the speed command signal to the servo amplifier, or provides a reverse signal that drives the rod in the reverse direction to that for pressurizing, and stops the rod or drives it in the reverse direction.

By the ninth aspect of this invention, the servo controller can set the speed of the rod and set a load for stopping that is a load set to less than or equal to a target load, and that is used so as to determine whether the rod should be stopped or whether the rod should be driven in the reverse direction to that for pressurizing so that the load for pressurizing does not exceed the target load.

Further, the servo controller can drive the rod in a speed-control mode based on the speed set for driving the rod, determine whether the load for pressurizing detected by the load detector is bigger than or equal to the load for stopping, and when it is determined that the load for pressurizing is bigger than or equal to the load for stopping, then the servo controller stops providing the speed command signal to the servo amplifier, or provides a reverse signal that drives the rod in the reverse direction to that for pressurizing, and stops the rod or drives it in the reverse direction.

Thus, the servo controller can stop the rod so that the load for pressurizing does not significantly exceed the target load. Also, since the speed of the rod is not reduced until the load for pressurizing reaches the load for stopping, the time for pressurization can be shortened.

The tenth aspect of this invention relates to the system for controlling an electric cylinder of the ninth aspect of this invention. Namely, it is characterized in that the servo controller comprises a setting means that sets the load for stopping based on the speed of driving and based on the target load, wherein the speed and the load are set for the rod.

By the tenth aspect of this invention, the servo controller comprises a setting means that sets the load for stopping based on both the speed of driving and the target load that are set for the rod. Therefore, steps for calculating the load for stopping and inputting it to the servo controller can be skipped. Also, errors in calculation and inputting can be eliminated.

BEST MODE FOR CARRYING OUT THE INVENTION

First Embodiment

Figure 1:
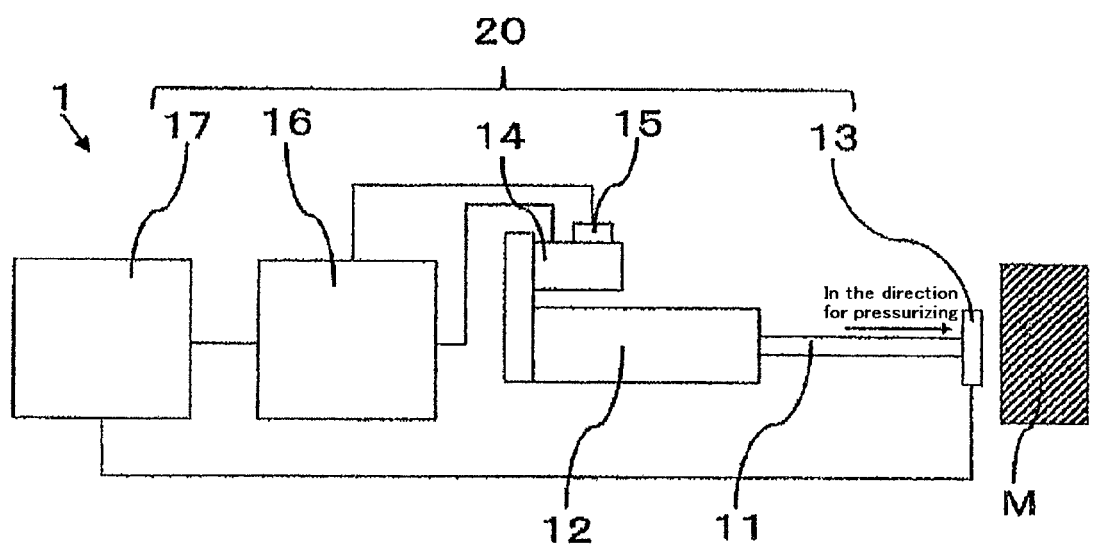
FIG. 1 is a schematic view of the device for press work that comprises the control system for the electric cylinder of this invention.

Now we discuss a first embodiment of this invention, i.e., by illustrating an example of a device for press work as an electric cylinder device. Namely, we discuss a control system and a method for controlling the electric cylinder by referring to the drawings. In this case, the first embodiment corresponds to the invention for controlling a servomotor in a position control mode.

Example 1

As in FIG. 1, the device for press work 1 comprises a rod 11, an electric cylinder 12, a load detector 13, a servomotor 14, a position detector 15, a servo amplifier 16, and a servo controller 17. The rod 11 pressurizes a material to be pressed M. The electric cylinder 12 moves the rod 11 in an axial direction. The load detector 13 is attached to the rod 11 and detects the load for pressurizing applied to a material to be pressed M. The servomotor 14 drives the electric cylinder 12. The position detector 15 is typically such an encoder as that attached to the servomotor 14 and is electrically connected to the servo amplifier 16. The servo amplifier 16 is electrically connected to the servomotor 14 and the servo controller 17, and controls the drive of the servomotor 14. The servo controller 17 is electrically connected to the load detector 13 and the servo amplifier 16, and outputs a position-control command to the servo amplifier 16 so as to control the position of the servomotor 14. The servo controller 17 is a so called positioning unit.

A control unit 20, which works as a control system for an electric cylinder, comprises the load detector 13, the servomotor 14, the position detector 15, the servo amplifier 16, and the servo controller 17.

The servo amplifier 16 and the servo controller 17 are configured so that they can control at least the servomotor 14 in a position control mode.

The control system for the electric cylinder of this embodiment is configured so that an operator can choose a control mode other than the position-control mode, i.e., he or she can choose either a speed-control mode or torque-control mode. The speed-control mode is discussed later as a second embodiment.

Figure 2:
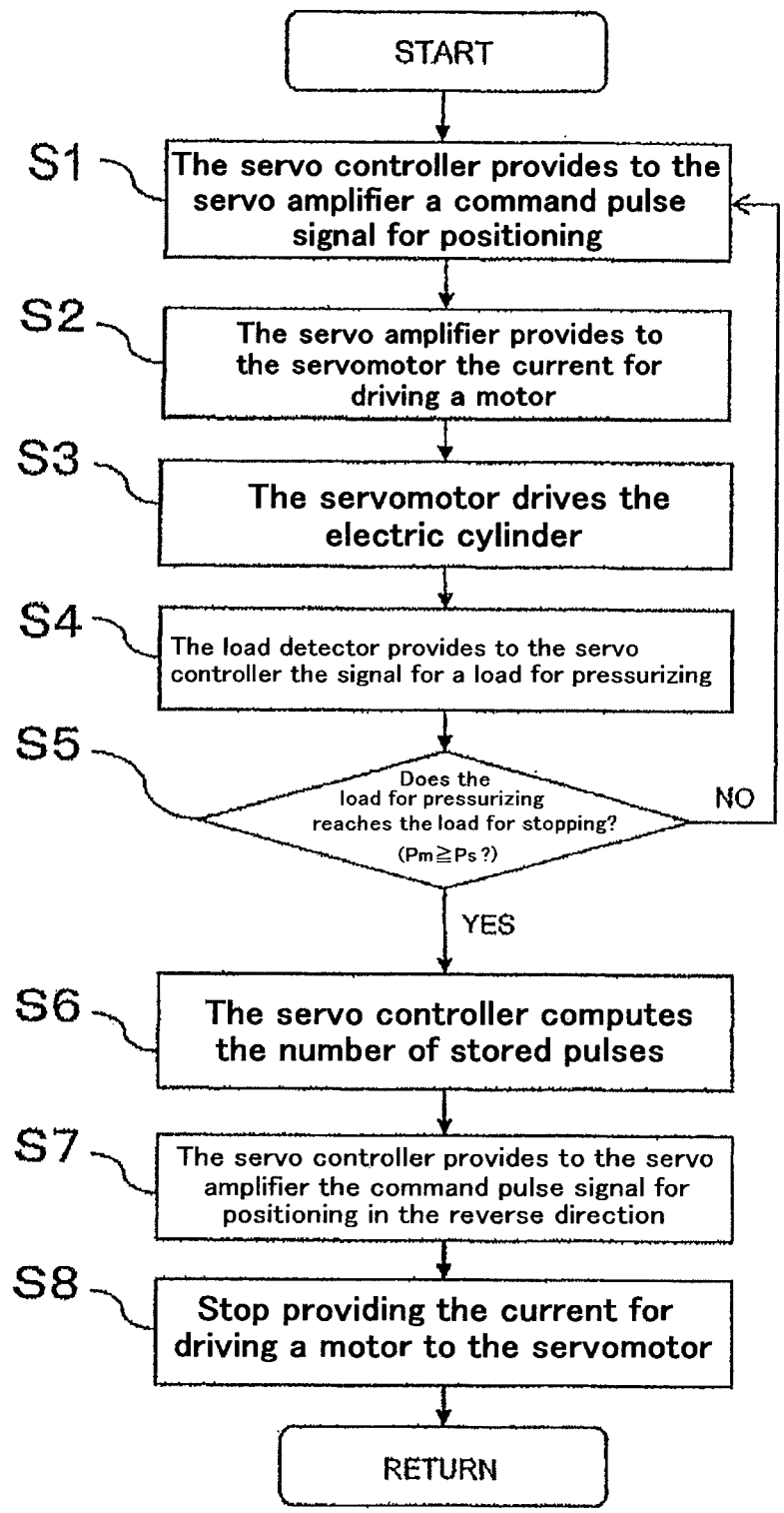
FIG. 2 is a flowchart that shows the method for controlling the electric cylinder of this invention, when the servomotor is controlled in a position control mode.

Now we discuss a method for controlling in this invention by referring to FIG. 2. First, the position-control mode is chosen as a control mode in the servo controller 17. Then a speed of driving the rod, a target load Pt at which the material to be pressed M is pressed, and a load for stopping Ps at which the rod 11 is stopped, are input via an input device, which is not shown. In this embodiment, the load for stopping Ps is set at the same value as the target load Pt.

After a material to be pressed M is set at a predetermined position, the operation is started. At step S1, the servo controller 17 provides a command pulse signal for positioning to the servo amplifier 16 based on the input speed of driving the rod 11.

At the next step, S2, a deviation counter in the servo amplifier 16 counts the number of pulses in the command pulse signal for positioning based on the command pulse signal for positioning that is provided to the servo controller 17 at step S1. Then the servo amplifier 16 provides to the servomotor 14 the current for driving a motor that corresponds to the frequency of pulses and the number of pulses.

At the next step, S3, the servomotor 14 is driven at the current that is provided by the servo amplifier 16. The rotation of the servomotor 14 is converted into a linear motion by a ball screw mechanism that is built in the electric cylinder 12, so that the cylinder 12 can drive the rod 11. Thus the rod 11 goes forward to press the material to be pressed M. The load for pressurizing Pm is detected by the load detector 13.

As the servomotor 14 rotates, the position detector 15 that is attached to the servomotor 14 provides a signal to the servo amplifier 16 that denotes an absolute position corresponding to the rotation of the servomotor 14. The servo amplifier 16 converts the information on the signal denoting an absolute position into a feedback pulse signal and provides it to the servo controller 17. Further, the servo amplifier 16 controls the rotation of the servomotor 14 corresponding to the difference between the number of pulses of the command pulse signal for positioning and the number of pulses of the feedback pulse signal, i.e., corresponding to the number of stored pulses. The number of pulses of the command pulse signal for positioning is proportional to the angle of rotation of the servomotor 14. Therefore, the speed of driving the servomotor 14 is controlled by the frequency of the pulses of the command pulse signal for positioning, and the migration length is determined by the number of pulses.

At the next step, S4, the signal for a load for pressurizing that corresponds to the load for pressurizing Pm detected by the load detector 13 is provided by the load detector 13 to the servo controller 17.

At the next step, S5, the servo controller 17 determines whether the load for pressurizing Pm reaches the load for stopping Ps, i.e., whether the load for pressurizing Pm is bigger than or equal to the load for stopping Ps. If Pm≥Ps (yes, at step S5), the method goes to step S6, if Pm<Ps (no, at step S5), it goes back to step S1. The command pulse signal for positioning continues to be provided by the servo controller 17 to the servo amplifier 16 so that the rod 11 advances at the predetermined speed of driving until the load for pressurizing Pm reaches the load for stopping Ps.

At the next step, S6, the servo controller 17 computes the difference between the number of pulses of the command pulse signal for positioning and the number of pulses of the feedback pulse signal, i.e., the number of stored pulses, at the determination step S5.

At the next step, S7, based on the number of stored pulses that is computed at step S6, the servo controller 17 provides to the servo amplifier 16 the command pulse signal for positioning in the reverse direction. The command pulse signal is a position control pulse signal for reversely driving the rod 11. Namely, it is a position control pulse signal for reversely rotating the servomotor and decreases the number of stored pulses.

The pulses for the command for positioning in the reverse direction are the pulses for a command for positioning which are reverse to the stored pulse. It can be configured as a train of reverse pulses that reverses the mark of the train of the pulses of the stored pulses, which are pulses for a positive direction.

At the next, step S8, the servo amplifier 16 decreases the number of stored pulses to stop providing the current for driving a motor to the servomotor 14, based on the command pulse signal for positioning in the reverse direction that is provided by the servo controller 17 at step S7. The load when the rod 11 is stopped is maintained for a predetermined time and then the load is drawn off.

By using the method for controlling the electric cylinder 12 or using the control system 20 for the electric cylinder 12, the rod 11 is driven in a position-control mode based on the command pulse signal for positioning. The servo controller 17 determines whether the load for pressurizing Pm that is detected by the load detector 13 is bigger than or equal to the target load Pt. If it is determined that the load for pressurizing Pm is bigger than or equal to the target load Pt, the controller 17 provides to the servo amplifier 16 a command pulse signal for positioning in the reverse direction. Thus, the number of stored pulses is forced to be decreased to stop the rod 11.

Since time is needed to decrease the number of stored pulses and since the mechanical elements of the system for driving the device for a press work 1 has inertia, the rod 11 may not stop at the exact target load Pt. Therefore, the load for pressurizing Pm may increase. However, in a short period of time, the number of stored pulses can be decreased and the rod 11 can be stopped. Therefore, the load for pressurizing Pm does not significantly exceed the target load Pt before the rod 11 stops.

Also, since the speed of the rod 11 is not decreased until the load for pressurizing Pm reaches the target load Pt, the time for pressurization can be shortened.

The number of pulses of the command for positioning in the reverse direction can be set to any value as long as the value does not cause the load for pressurizing Pm to significantly exceed the target load Pt before the rod 11 stops. Preferably, it should be more than or equal to the number of stored pulses so as to rapidly decrease the number of stored pulses to 0 (zero). Especially, if the number of pulses of the command for positioning in the reverse direction is more than the number of stored pulses, a force to drive the servomotor 14 in the reverse direction will appear and thus the load for pressurizing can be rapidly decreased. Therefore, the load for pressurizing can be efficiently gotten close to the target load.

Also, preferably, the frequency of the command pulse signal for positioning in the reverse direction is more than or equal to the frequency of the pulse of the command for positioning, so that the number of stored pulses rapidly decreases.

By applying this invention to a process for a press work, the press work can be carried out so that the load for pressurizing Pm will not significantly exceed the target load Pt. Accordingly, it causes the quality of the product by this press work to be improved. Also, it leads to a lower cost for the product, because the product can be produced in a short time.

(Evaluation Test 1)

The effect of Example 1 of the first embodiment was verified by comparing it to the effect of a conventional method for controlling an electric cylinder as an comparative example. However, this invention will not be restricted to the matter that is disclosed by the following evaluation test.

Figure 4:
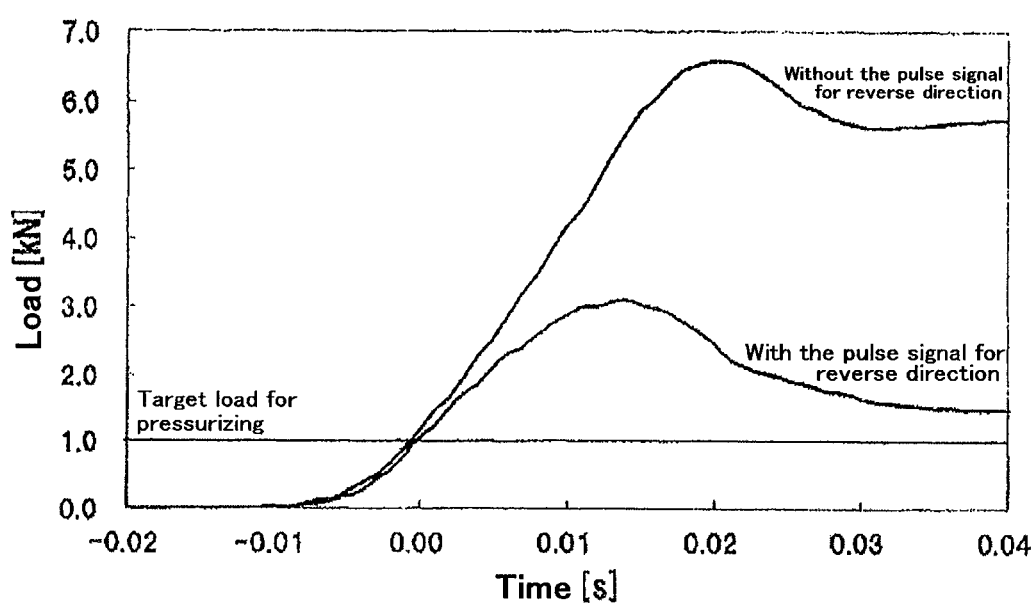
FIG. 4 is a graph that shows two waveforms of loads for pressurizing, for a comparison. One is when the first embodiment of the method for controlling the electric cylinder of this invention for position controlling a servomotor is used. The other is when a conventional method for controlling an electric cylinder is used.

FIG. 4 shows two waveforms of loads for pressurizing, for a comparison. One is when the method for controlling an electric cylinder of example 1 is used. The other is when a conventional method for controlling an electric cylinder is used as a comparative example. The condition for pressurizing was that the speed of driving when the pressurizing was started was 10 mm/s and the target load Pt was 1 kN. The comparative example used a conventional method that used no pulses for command for positioning in the reverse direction.

In FIG. 4, the origin of the temporal axis is when the load for pressurizing reaches the target load 1 kN.

As in FIG. 4, by the comparative example, the load for pressurizing significantly exceeded the target load, i.e., 1 kN, and became constant at about 6 kN. In contrast, by Example 1, the load for pressurizing once exceeded the target load, i.e., 1 kN, but became constant at about 1.5 kN. It was verified by Example 1 that the pressurizing can be achieved without significantly exceeding the target load, i.e., 1 kN.

Effect of Example 1

The method for controlling an electric cylinder and the control system for the electric cylinder, of this invention, drives the rod 11 in a position-control mode, based on the command pulse signal for positioning. The servo controller 17 determines whether the load for pressurizing Pm that is detected by the load detector 13 is bigger than or equal to the target load Pt. If it is determined that the load for pressurizing Pm is bigger than or equal to the target load Pt, the controller 17 provides to the servo amplifier 16 a command pulse signal for positioning in the reverse direction. Thus, the number of stored pulses in the servo amplifier 16 is forced to be decreased to stop the rod 11.

Accordingly, in a short period of time, the number of stored pulses can be decreased and the rod 11 can be stopped. Therefore, the load for pressurizing Pm does not significantly exceed the target load Pt before the rod 11 stops.

Also, since the speed of the rod 11 is not decreased until the load for pressurizing Pm reaches the target load Pt, the time for pressurization can be shortened.

Example 2

Now we discuss Example 2 of the first embodiment of this invention. Example 2 differs from Example 1 in that at step S5 the load for stopping Ps is set to the following value instead of being set to the target load Pt.

The load for stopping Ps in example 2 is set to a value that is lower than the target load Pt. For this setting, some factors that cause the material to be pressed to be overloaded are considered. The factors are the time needed for decreasing the number of stored pulses, the inertia of the mechanical elements of the system for driving the device for a press work 1, etc. Thus, the set value is determined by analyzing the system or by an experiment so that the rod 11 should be stopped at the target load Pt when the servo controller 17 provides the command pulse signal for positioning in the reverse direction to stop the electric cylinder 12 at step S7.

(Evaluation Test 2)

The effect of Example 2 was verified by comparing it to the effect of a conventional method for controlling an electric cylinder, as a comparative example. However, this invention is not restricted to the matters that are disclosed by the following evaluation test.

Figure 5:
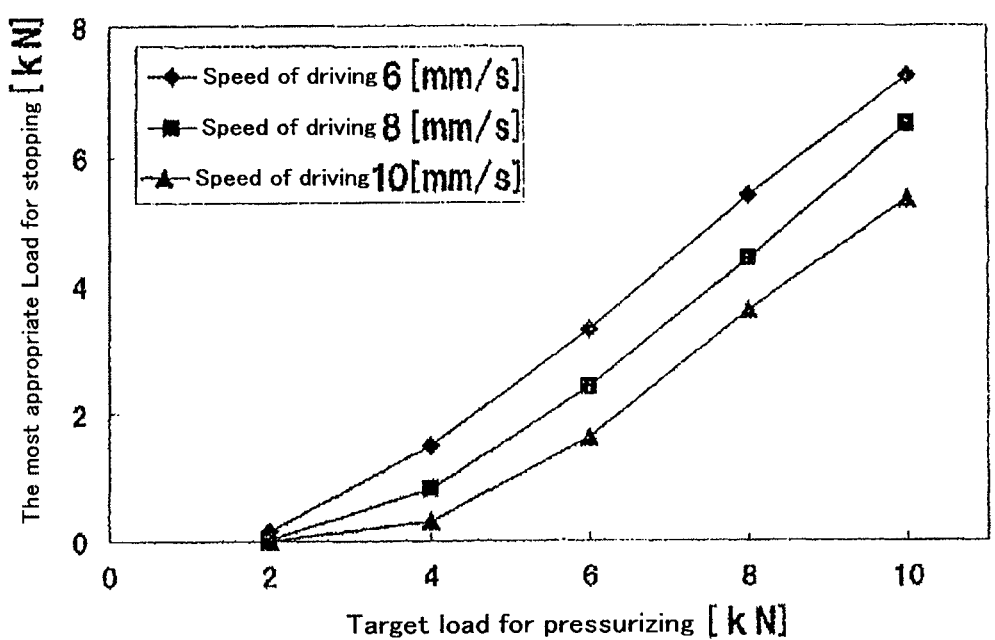
FIG. 5 is a graph that shows the relationship between the target load and the load for stopping, of an electric cylinder.

In FIG. 5, we show the relationship between target loads Pt and loads for stopping Ps, which relationship was experimentally determined. The speeds of driving a rod 11 were verified for three levels, i.e., 6, 8, and 10 mm/s. We found that the faster the speed of driving became, the bigger the difference between the target load Pt and the load for stopping Ps tended to be.

As in FIG. 5, by deciding the speed of driving and the target load Pt, it can be decided what value for the load should be set for the load for stopping Ps. For example, it can be seen that if the speed of driving is 10 mm/s and the target load Pt is 10 kN, the load for stopping Ps should be set at 5.35 kN.

Next, we compared using the method for controlling the electric cylinder of the invention of this application to using a conventional method for controlling an electric cylinder. The condition for pressurizing was that the speed of driving when the pressurizing started was 10 mm/s and the target load Pt was 10 kN. The load was set to be maintained at the target load Pt for 0.025 second and then the load was removed. The load for stopping Ps was set at 5.35 kN based on the relationship in FIG. 5.

As a comparative example, a well-known method is used in which the speed of driving an electric cylinder decreases in proportion to the increase of the load for pressurizing, e.g., the method disclosed by Japanese Patent Publication Laid-open No. 2005-254290.

Figure 6:
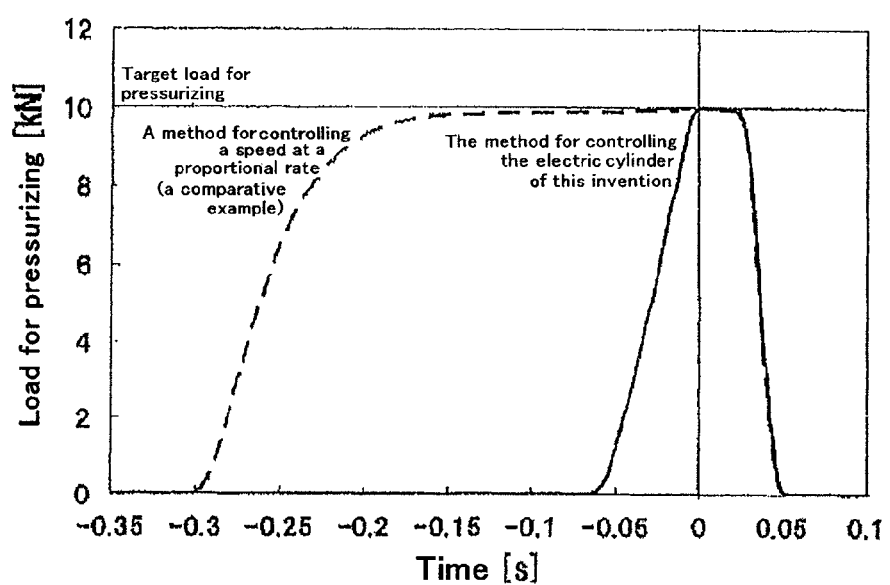
FIG. 6 is a graph that shows two waveforms of loads for pressurizing for a comparison. One is when the method for controlling the electric cylinder of this invention is used. The other is when a method for controlling a speed at a proportional rate (a comparative example) is used.

In FIG. 6, the origin of the temporal axis is when the load for pressurizing reaches the target load Pt.

As in FIG. 6, by the comparative example, it took 0.3 second for the load for pressurizing Pm to get the target load Pt. In contrast, by example 2, the load for pressurizing Pm did not significantly exceed the target load Pt. Also, it reached the target load Pt in 0.07 second, which was in a relatively short time, i.e., about a quarter of the time of the comparative example. Accordingly, it was verified that by appropriately setting the load for stopping Ps as in FIG. 6, the load for pressurizing Pm can be controlled for the load Pt, and that the pressurizing can be achieved in a short time.

By example 2, the load for stopping Ps was input into the servo controller 17 independently from the target load Pt. However, it is possible to configure the system so that when a target load Pt is input into the servo controller 17, the load for stopping Ps will be automatically set by referring to a table or an equation for arithmetic calculation. The table or the equation for arithmetic calculation is stored in the means for setting the load for stopping in the servo controller 17. This configuration can save the trouble of calculating the load for stopping Ps and inputting the result to the servo controller 17.

Also, it prevents the load for stopping Ps from being miscalculated. Further, it prevents the servo controller 17 from having incorrect data input.

Effect of Example 2

The method for controlling the electric cylinder of example 2, and the control system for the electric cylinder of example 2, which cylinder drives the rod 11 in a position-control mode, is based on the command pulse signal for positioning. It is determined whether the load for pressurizing Pm detected by the load detector 13 is bigger than or equal to the load for stopping Ps. If it is determined that the load for pressurizing Pm is bigger than or equal to the load for stopping Ps, a command pulse signal for positioning in the reverse direction is provided to the servo amplifier 16. Thus, the number of stored pulses in the servo amplifier 16 is forced to be decreased to stop the rod 11 at the target load.

Also, since the speed of the rod 11 is not decreased until the load for pressurizing Pm reaches the load for stopping Ps, the time for pressurization can be shortened.

Another Example

In examples 1 and 2, we discuss when the method or the system for controlling the electric cylinder is applied to a device for press work 1. However, this invention will not be restricted to this application, i.e., besides a device for press work, it can be applied to any other device or process that uses an electric cylinder.

For example, if this invention is applied to a process for a press-fitting, the press-fitting can be done so that a load for pressurizing does not significantly exceed a target load for pressurizing. Accordingly, it causes the quality of the product by this process to be improved. Also, it leads to a lower cost for the product made by this process, because the product can be produced in a short time.

Further, if this invention is applied to a process for a press-fitting in which a pressure is relieved in the process for pressurizing, its cycle time will significantly shorter compared to a conventional process such as that which reduces the speed of the rod of an electric cylinder at a constant ratio or that reduces it proportionally to the load for pressurizing.

Also, if this invention is applied to a process for conveying articles, the articles can be rapidly conveyed. In addition, if a rod happens to bump any article, the rod can be immediately stopped or its speed can be reduced. Therefore, the system has an advantage in that damages to the rod, the load detector, or the articles, can be avoided.

Further, in this invention, the direction for moving the rod 11 is not only for extruding, but it can also be for pulling. Accordingly, this invention can be applied to the process for pulling, as well as the process for pressurizing.

Second Embodiment

Now we discuss a second embodiment of this invention, i.e., by illustrating an example of a device for press work functioning as an electric cylinder device. Namely, we discuss a control system and a method for controlling the electric cylinder by referring to the drawings. In this case, the second embodiment corresponds to the invention for controlling a servomotor in a speed-control mode.

As in FIG. 1, the device for press work 1 of the second embodiment comprises a rod 11, an electric cylinder 12, a load detector 13, a servomotor 14, a position detector 15, a servo amplifier 16, and a servo controller 17. The rod 11 pressurizes a material to be pressed M. The electric cylinder 12 moves the rod 11 in an axial direction. The load detector 13 is attached to the rod 11 and detects the load for pressurizing applied to a material to be pressed M. The servomotor 14 drives the electric cylinder 12. The position detector 15 is electrically connected to the servomotor 14 and detects the position of the rod 11. The servo amplifier 16 is electrically connected to the servomotor 14 and a servo controller 17, and controls the drive of the servomotor 14. The servo controller 17 is electrically connected to the load detector 13 and the servo amplifier 16, and outputs a speed-control command to the servo amplifier 16 so as to control the speed of the servomotor 14. The servo controller 17 is a so called positioning unit.

A control unit 20, which works as a control system for the electric cylinder 12, comprises the load detector 13, the servomotor 14, the servo amplifier 16, and the servo controller 17.

The servo amplifier 16 and the servo controller 17 are configured so that they can control at least the servomotor 14 in a speed-control mode. As previously described, the control system for the electric cylinder of this embodiment is configured so that an operator can choose a control mode from a position-control mode and a torque-control mode, as well as the speed-control mode.

Figure 3:
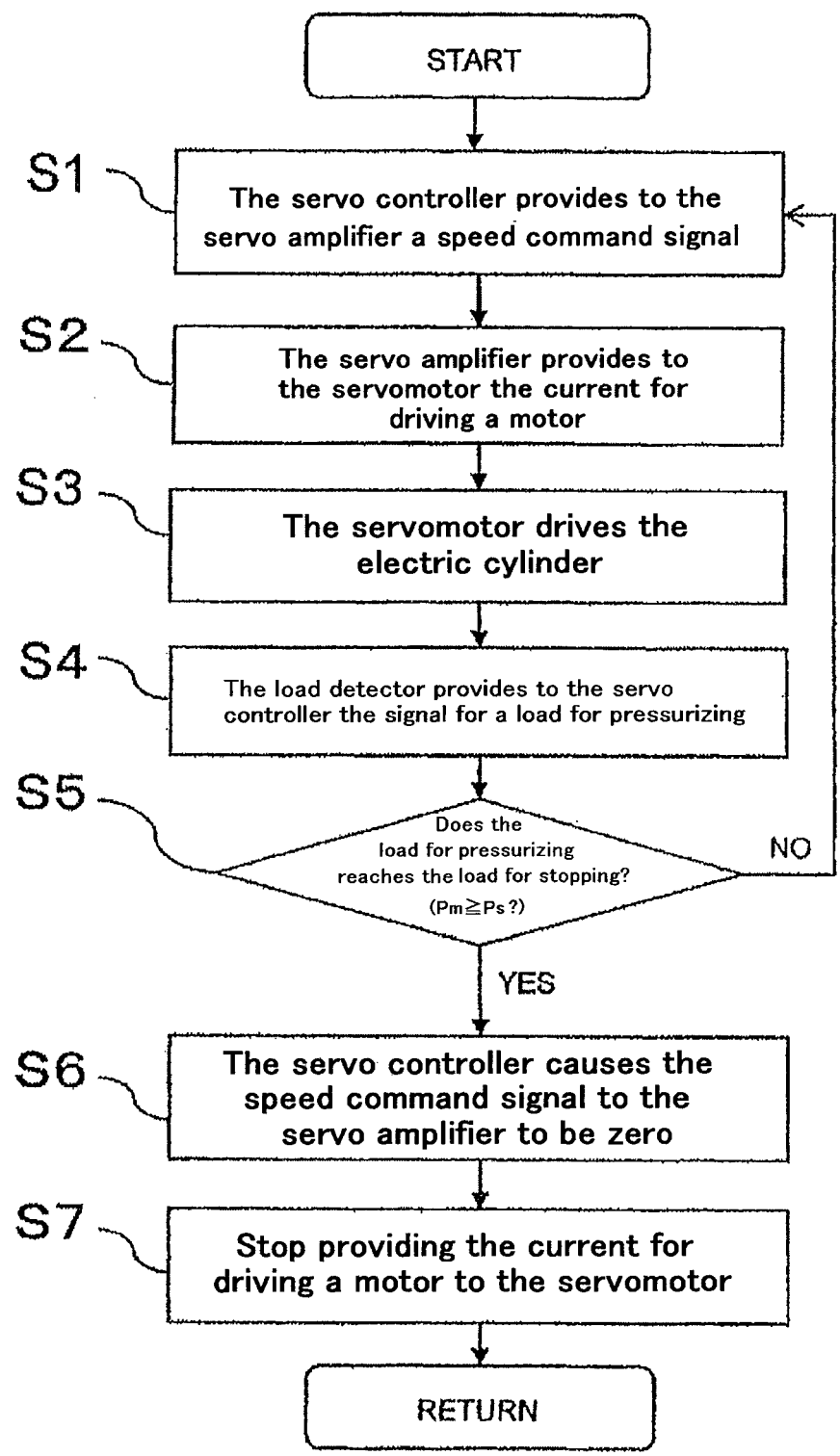
FIG. 3 is a flowchart that shows the method for controlling the electric cylinder of this invention, when the servomotor is controlled in the speed control mode.

Now we discuss a method for controlling by the second embodiment of this invention by referring to FIG. 3.

First, the speed-control mode is chosen as a control mode in the servo controller 17. Then a speed of driving the rod 11, a target load Pt at which the material to be pressed M is pressed, and a load for stopping Ps at which the rod 11 is stopped, is input via an input device, which is not shown.

In this embodiment, the load for stopping Ps is set to a lower value than that of the target load Pt. For this setting, some factors that cause an overload to be applied to the material to be pressed such as the inertia of the mechanical elements of the system for driving of the device for press work 1, etc., are considered. Thus, the set value is determined by analyzing the system or by an experiment so that the rod 11 is stopped at the target load Pt when the electric cylinder 12 is directed to be stopped at the load for stopping Ps at step S7. The step S7 is described later.

After the material to be pressed M is set at a predetermined position of the device for press work 1, the operation is started. At step S1, the servo controller 17 provides a speed command signal to the servo amplifier 16 based on the input speed of driving the rod 11.

At the next step, S2, the servo amplifier 16 provides the current for driving a motor to the servomotor 14 based on the speed command signal input by the servo controller 17 at step S1.

At the next step, S3, the servomotor 14 is driven at the current that is provided by the servo amplifier 16. The rotation of the servomotor 14 is converted into a linear motion by a ball screw mechanism that is built in the electric cylinder 12, so that the cylinder 12 can drive the rod 11. Thus the rod 11 goes forward to press the material to be pressed M. The load for pressurizing Pm is detected by the load detector 13.

At the next step S4, the signal for a load for pressurizing that corresponds to the load for pressurizing Pm detected by the load detector 13 is provided from the load detector 13 to the servo controller 17.

At the next step, S5, the servo controller 17 determines whether the load for pressurizing Pm reaches the load for stopping Ps, i.e., whether the load for pressurizing Pm is bigger than or equal to the load for stopping Ps. If Pm≥Ps (yes, at step S5), the method goes to step S6, if Pm<Ps (no, at step S5), it goes back to step S1. The speed command signal continues to be provided from the servo controller 17 to the servo amplifier 16 so that the rod 11 advances at the predetermined speed of driving until the load for pressurizing Pm reaches the load for stopping Ps.

At step S6, the servo controller 17 stops providing the speed command signal to the servo amplifier 16 (the signal becomes zero).

At the next step, S7, the servo amplifier 16 stops providing the current for driving a motor to the servomotor 14. Thus, the servomotor 14 can be immediately stopped. Because of the inertia of the mechanical elements of the system for driving the device for press work 1, etc., the rod 11 will not stop at the load for stopping Ps and the load for pressurizing Pm will be more than that for stopping Ps. However, the rod 11 can be stopped at the target load Pt.

The load when the rod 11 is stopped is maintained for a predetermined time and then the load is removed.

By using the method or system for controlling the electric cylinder 12 described above, the rod 11 is driven in a speed-control mode based on the speed of driving that has been set. It is determined whether the load for pressurizing Pm detected by the load detector 13 is bigger than or equal to the load for stopping Ps. If it is determined that the load for pressurizing Pm is bigger than or equal to that for stopping Ps, a signal for stopping is provided to the servo amplifier 16 so that the speed of the rod 11 will become 0 (zero). Thus the rod 11 can be stopped at the target load Pt.

Also, since the speed of the rod 11 is not decreased until the load for pressurizing Pm reaches the load for stopping Ps, the time for pressurization can be shortened.

By applying this invention to a process for press work, the press work can be carried out so that the load for pressurizing Pm will not significantly exceed the target load Pt. Accordingly, it causes the quality of the product by this press work to be improved. Also, it leads to a reduction in cost for the product, because the product can be produced in a short time.
(Evaluation Test)

The effect of the second embodiment was verified by comparing it to the effect of a conventional method for controlling an electric cylinder, as a comparative example. However, this invention will not be restricted to the matter that is disclosed by the following evaluation test.

In FIG. 5, we show the relationship between target loads Pt and loads for stopping Ps, which relationship was experimentally determined. It was the same as the relationship between those of the first embodiment. The speeds of driving the rod 11 were verified for three levels, i.e., 6, 8, and 10 mm/s. We found that the faster the speed of the driving became, the bigger the difference between the target load Pt and the load for stopping Ps tended to be.

As in FIG. 5, by deciding the speed of driving and the target load Pt, it can be decided what value for the load should be set for the load for stopping Ps. For example, it can be seen that if the speed of driving is 10 mm/s and the target load Pt is 10 kN, the load for stopping Ps should be set to 5.35 kN.

Next, in a way analogous to the first embodiment, we compared using the method for controlling an electric cylinder of the invention of this application to using a conventional method for controlling an electric cylinder (a comparative example).

The condition for pressurizing was that the speed of driving when the pressurizing started was 10 mm/s and the target load Pt was 10 kN. The load was set to maintain the target load Pt for 0.025 second, and then the load was removed. The load for stopping Ps was set to 5.35 kN based on the relationship in FIG. 5.

As a comparative example, a well-known method was used in which the speed of driving an electric cylinder decreases in proportion to the increase of the load for pressurizing, e.g., the method disclosed by Japanese Patent Publication Laid-open No. 2005-254290 was used as a comparative example.

In FIG. 6, the origin of the temporal axis is when the load for pressurizing reaches the target load Pt.

As in FIG. 6, by the comparative example, it took 0.3 second for the load for pressurizing Pm to reach the target load Pt. In contrast, by this embodiment, the load for pressurizing Pm did not exceed the target load Pt. Also, it reached the target load Pt in 0.07 second, which was in a relatively short time, i.e., about a quarter of the time of the comparative example.

Accordingly, it was verified that by appropriately setting the load for stopping Ps as in FIG. 6, the load for pressurizing Pm can be controlled for the target load Pt, and that the pressurizing can be achieved in a short time.

By the second embodiment, the load for stopping Ps was input into the servo controller 17 independently from the target load Pt. However, like the first embodiment, it is possible to configure the system so that when a target load Pt is input into the servo controller 17, the load for stopping Ps will be automatically set by referring to a table or an equation for arithmetic calculation. The table or the equation for arithmetic calculation is stored in the means for setting the load for stopping in the servo controller 17. This configuration can avoid the trouble of calculating the load for stopping Ps and inputting the result to the servo controller 17. Also, it prevents the load for stopping Ps from being miscalculated. Further, it prevents the servo controller 17 from having incorrect data input.

By the second embodiment, the electric cylinder 12 was controlled to be stopped. However, if the load for pressurizing need not be held, the electric cylinder 12 may be moved in the direction reverse to that for pressurizing. In this case, a speed command signal that causes the electric cylinder 12 to move in the reverse direction (a reverse signal) may be input based on the condition of the speed that has been set at step S6. Accordingly, since no holding time is needed for the electric cylinder 12, the time for pressurization can be further shortened.

Effect of the Second Embodiment

The method for controlling an electric cylinder and the control system for the electric cylinder of the invention of this application drives the rod 11 in a speed-control mode, based on the speed of driving that has been set. It is determined whether the load for pressurizing Pm detected by the load detector 13 is bigger than or equal to the load for stopping Ps. If it is determined that the load for pressurizing Pm is bigger than or equal to the load for stopping Ps, a stop signal that causes the speed of the rod 11 to be 0 (zero) is provided to the servo amplifier 16. Thus, the rod 11 can be stopped at the target load.

Also, since the speed of the rod 11 is not decreased until the load for pressurizing Pm reaches the load for stopping Ps, the time for pressurization can be shortened.

Other Examples

In the second embodiment, as well as in the first embodiment, we discuss when the method or the system for controlling the electric cylinder 12 is applied to a device for press work 1. However, this invention will not be restricted to this application, i.e., besides a device for press work, it can be applied to any other devices or processes that use an electric cylinder, which is discussed as the second embodiment.

EXPLANATION OF THE DENOTATIONS 1 a device for press work
11 a rod
12 an electric cylinder
13 a load detector
14 a servomotor
15 a position detector
16 a servo amplifier
17 a servo controller
20 a control unit
Pm a load for pressurizing
Ps a load for stopping
Pt target load

What is claimed is:

1. A method for controlling an electric cylinder in a device, wherein
the device comprises
an electric cylinder that moves a rod,
a load detector attached to the rod that detects the load for pressurizing applied to a material to be pressed,
a servo motor that drives the electric cylinder, and
a position detector attached to the servo motor that is electrically connected to a servo amplifier, wherein
the servo amplifier is electrically connected to the servo motor and a servo controller and controls the drive of the servo motor, and wherein
the servo controller is electrically connected to the load detector and the servo amplifier and outputs a position control command to the servo amplifier so as to control the position of the servo motor,
the method comprising:
a step S1 in which the servo controller sets the speed of the rod, sets a load for stopping that is a load set to less than or equal to a target load, and that is used for determining whether the rod should be stopped so that the load for pressurizing does not exceed the target load, and provides a command pulse signal for positioning from the servo controller to the servo amplifier based on the speed of the rod wherein the speed is input into the servo controller,
a step S2 in which the servo amplifier provides current for driving a motor to the servo motor based on the command pulse signal for positioning,
a step S3 in which a servo motor is driven so as to drive the rod by the current for driving a motor,
a step S4 in which a signal for a load for pressurizing, wherein the signal corresponds to the load for pressurizing detected by the load detector, is provided from the load detector to the servo controller,
a step S5 in which the servo controller determines whether the load for pressurizing is bigger than or equal to the load for stopping based on the signal for the load for pressurizing,
a step S6 in which the number of stored pulses is computed if it is determined that the load for pressurizing is bigger than or equal to the load for stopping, wherein the number of stored pulses is the difference between the number of pulses of the command pulse signal for positioning at the determination in step 5 and the number of pulses of the feedback pulse signal that is provided to the servo controller from the servo amplifier based on the signal of an absolute position that is provided to the servo amplifier from the position detector based on the speed of the rotation of the servo motor, and
a step S7 in which a command pulse signal for positioning in the reverse direction is provided to the servo amplifier from the servo controller, wherein the command pulse signal is a position control pulse signal that decreases the number of stored pulses based on the number of stored pulses computed at step 6.

2. The method for controlling the electric cylinder of claim 1, wherein the number of pulses of the command pulse signal for positioning in the reverse direction is more than or equal to the number of stored pulses.

3. The method for controlling the electric cylinder of claim 1 or 2, wherein the frequency of the command pulse signal for positioning in the reverse direction is more than or equal to the frequency of the pulse of the command for positioning.

4. A method for controlling an electric cylinder in a device, wherein
the device comprises
an electric cylinder that moves a rod,
a load detector attached to the rod that detects the load for pressurizing applied to a material to be pressed,
a servo motor that drives the electric cylinder,
a servo amplifier that is electrically connected to the servo motor and a servo controller and that controls the drive of the servo motor, wherein
the servo controller is electrically connected to the load detector and the servo amplifier and outputs a speed control command to the servo amplifier so as to control the speed of the servo motor,
the method comprising:
a step S1 in which the servo controller
sets the speed of the rod,
sets a load for stopping that is a load set to less than or equal to a target load, and that is used for determining whether the rod should be stopped or whether the rod should be driven in the reverse direction to that for pressurizing so that the load for pressurizing does not exceed the target load, and
provides a speed command signal from the servo controller to the servo amplifier based on the speed of the rod wherein the speed is input into the servo controller,
a step S2 in which the servo amplifier provides current for driving a motor to the servo motor based on the speed command signal,
a step S3 in which a servo motor is driven so as to drive the rod by the current for driving a motor,
a step S4 in which a signal for a load for pressurizing, wherein the signal corresponds to the load for pressurizing detected by the load detector, is provided by the load detector to the servo controller,
a step S5 in which the servo controller determines whether the load for pressurizing is bigger than or equal to the load for stopping based on the signal for the load for pressurizing,
a step S6 in which when it is determined that the load for pressurizing is bigger than or equal to the load for stopping the servo controller stops providing the speed command signal to the servo amplifier, or provides a reverse signal that drives the rod in the reverse direction to that for pressurizing, and
a step S7 in which based on the stopping of the speed command signal or based on the reverse signal the servo amplifier stops providing the current for driving a motor to the servo motor, or provides a current that drives the rod in the reverse direction to that for pressurizing.

5. The method for controlling an electric cylinder of claim 4, wherein the load for stopping is set by the servo controller based on the speed set for driving the rod and the target load.

6. A control system for an electric cylinder in a device, wherein
   the device comprises
   an electric cylinder that moves a rod,
   a load detector attached to the rod that detects the load for pressurizing applied to a material to be pressed,
   a servo motor that drives the electric cylinder,
   a position detector attached to the servo motor that is electrically connected to a servo amplifier, wherein
   the servo amplifier is electrically connected to the servo motor and a servo controller and controls the drive of the servo motor,
   the servo controller is electrically connected to the load detector and the servo amplifier and outputs a position control command to the servo amplifier so as to control the position of the servo motor, wherein
   the servo controller can set the speed of the rod and set a load for stopping that is a load set to less than or equal to a target load, and that is used so that the load for pressurizing does not exceed the target load, and
   further, the servo controller
   drives the rod based on the speed of the rod under the position control mode, and
   determines whether the load for pressurizing is bigger than or equal to the load for stopping, wherein
   if it determines that the load for pressurizing is bigger than or equal to the load for stopping, it provides a reverse command pulse signal that drives the rod in the reverse direction to that for pressurizing, and
   causes the number of stored pulses in the servo amplifier to decrease, to thereby stop the rod.

7. The control system for the electric cylinder of claim 6, wherein the number of pulses of the command pulse signal for positioning in the reverse direction is bigger than the number of stored pulses.

8. The control system for the electric cylinder of claim 6 or 7, wherein the frequency of the command pulse signal for positioning in the reverse direction is more than or equal to the frequency of the pulse of the command for positioning.

9. A system for controlling an electric cylinder in a device, wherein
   the device comprises
   an electric cylinder that moves a rod,
   a load detector attached to the rod that detects the load for pressurizing applied to a material to be pressed,
   a servo motor that drives the electric cylinder,
   a servo amplifier that is electrically connected to the servo motor and a servo controller and that controls the drive of the servo motor, wherein
   the servo controller is electrically connected to the load detector and the servo amplifier and outputs a speed control command to the servo amplifier so as to control the speed of the servo motor, wherein
   the servo controller can set
   the speed of the rod and set
   a load for stopping that is a load set to less than or equal to a target load, and that is used so as to determine whether the rod should be stopped or whether the rod should be driven in the reverse direction to that for pressurizing so that the load for pressurizing does not exceed the target load, and,
   further, the servo controller
   drives the rod in a speed-control mode based on the speed set for driving the rod,
   determines whether the load for pressurizing detected by the load detector is bigger than or equal to the load for stopping, and
   when it is determined that the load for pressurizing is bigger than or equal to the load for stopping the servo controller stops providing the speed command signal to the servo amplifier or provides a reverse signal that drives the rod in the reverse direction to that for pressurizing, and
   stops the rod or drives it in the reverse direction.

10. The control system for the electric cylinder of claim 9, wherein the servo controller comprises a setting means that sets the load for stopping based on the speed of driving and the target load that are set for the rod.

* * * * *